(12) United States Patent
Goncalves

(10) Patent No.: US 8,494,909 B2
(45) Date of Patent: Jul. 23, 2013

(54) AUTOMATIC LEARNING IN A MERCHANDISE CHECKOUT SYSTEM WITH VISUAL RECOGNITION

(75) Inventor: Luis Goncalves, Pasadena, CA (US)

(73) Assignee: Datalogic ADC, Inc., Eugene, OR (US)

( * ) Notice: Subject to any disclaimer, the term of this patent is extended or adjusted under 35 U.S.C. 154(b) by 474 days.

(21) Appl. No.: 12/658,581

(22) Filed: Feb. 9, 2010

(65) Prior Publication Data
US 2010/0217678 A1 Aug. 26, 2010

Related U.S. Application Data

(60) Provisional application No. 61/207,141, filed on Feb. 9, 2009.

(51) Int. Cl.
*G06G 1/14* (2006.01)
*G06K 9/00* (2006.01)

(52) U.S. Cl.
USPC .......................................... 705/22; 382/100

(58) Field of Classification Search
USPC .......................................... 705/22; 382/100
See application file for complete search history.

(56) References Cited

U.S. PATENT DOCUMENTS

| | | | | |
|---|---|---|---|---|
| 5,497,314 A * | 3/1996 | Novak | | 705/17 |
| 7,118,026 B2 * | 10/2006 | Harris et al. | | 235/375 |
| 7,121,469 B2 * | 10/2006 | Dorai et al. | | 235/470 |
| 7,290,707 B2 * | 11/2007 | Sawasaki | | 235/385 |
| 7,334,729 B2 * | 2/2008 | Brewington | | 235/383 |
| 7,337,960 B2 * | 3/2008 | Ostrowski et al. | | 235/383 |
| 7,340,079 B2 * | 3/2008 | Segawa et al. | | 382/118 |
| 7,699,223 B2 * | 4/2010 | Blake et al. | | 235/385 |
| 7,909,248 B1 * | 3/2011 | Goncalves | | 235/383 |
| 8,091,782 B2 * | 1/2012 | Cato et al. | | 235/385 |
| 2002/0138374 A1 * | 9/2002 | Jennings et al. | | 705/29 |
| 2004/0099741 A1 * | 5/2004 | Dorai et al. | | 235/462.08 |
| 2004/0111324 A1 * | 6/2004 | Kim | | 705/22 |
| 2004/0182650 A1 * | 9/2004 | Harris et al. | | 186/66 |
| 2005/0098633 A1 * | 5/2005 | Poloniewicz et al. | | 235/462.14 |
| 2005/0189411 A1 * | 9/2005 | Ostrowski et al. | | 235/383 |
| 2005/0189412 A1 * | 9/2005 | Hudnut et al. | | 235/383 |
| 2006/0147087 A1 * | 7/2006 | Goncalves et al. | | 382/103 |
| 2006/0261938 A1 * | 11/2006 | Lai et al. | | 340/505 |
| 2006/0283943 A1 * | 12/2006 | Ostrowski et al. | | 235/383 |
| 2007/0158417 A1 * | 7/2007 | Brewington | | 235/383 |

(Continued)

*Primary Examiner* — Matthew S Gart
*Assistant Examiner* — Ashford S Hayles
(74) *Attorney, Agent, or Firm* — Stoel Rives LLP

(57) ABSTRACT

A merchandise checkout system for ringing up merchandise in a grocery or other retail facility is disclosed. The merchandise checkout system includes visual sensors for acquiring images of an object to be rung up at checkout; a database configured to retain a visual model and UPC code of known items; and a processor configured to maintain and update the database with information about new merchandise presented for checkout. The visual model preferably includes at least one image of each item of merchandise in the retail store as well as geometric point features extracted from images of the merchandise. The processor in the exemplary embodiment is configured to: (a) compare the image of the object acquired at checkout to the visual model of the items in the database; (b) recognize the object based on the overall appearance of the packaging; (c) automatically ring up the price of the object at the POS; and (d) automatically add the acquired image to the database if the image of the object is new, i.e., it does not match the visual model of any of the items recorded in the database, thereby enabling the checkout system to dynamically and automatically build up its database of visual models.

26 Claims, 15 Drawing Sheets

U.S. PATENT DOCUMENTS

| | | | |
|---|---|---|---|
| 2007/0226088 A1* | 9/2007 | Miles et al. | 705/28 |
| 2007/0242870 A1* | 10/2007 | Anderson et al. | 382/141 |
| 2007/0278298 A1* | 12/2007 | Ali | 235/383 |
| 2008/0077511 A1* | 3/2008 | Zimmerman | 705/28 |
| 2008/0104011 A1* | 5/2008 | Shibasaki et al. | 707/1 |
| 2008/0149725 A1* | 6/2008 | Rosenbaum | 235/462.41 |
| 2008/0306787 A1* | 12/2008 | Hamilton et al. | 705/7 |
| 2009/0026269 A1* | 1/2009 | Connell et al. | 235/462.41 |
| 2009/0039164 A1* | 2/2009 | Herwig et al. | 235/462.41 |
| 2009/0060259 A1* | 3/2009 | Goncalves | 382/100 |
| 2009/0063307 A1* | 3/2009 | Groenovelt et al. | 705/28 |
| 2009/0072036 A1* | 3/2009 | Kwan | 235/462.32 |
| 2009/0097713 A1* | 4/2009 | DeLean | 382/115 |
| 2009/0121017 A1* | 5/2009 | Cato et al. | 235/385 |
| 2009/0132388 A1* | 5/2009 | Omori et al. | 705/27 |
| 2009/0194593 A1* | 8/2009 | Kurihara et al. | 235/462.41 |
| 2009/0226099 A1* | 9/2009 | Kundu et al. | 382/224 |
| 2009/0236419 A1* | 9/2009 | Connell, II et al. | 235/383 |
| 2009/0240735 A1* | 9/2009 | Grandhi et al. | 707/104.1 |
| 2009/0245573 A1* | 10/2009 | Saptharishi et al. | 382/103 |
| 2009/0319388 A1* | 12/2009 | Yuan et al. | 705/26 |
| 2010/0002902 A1* | 1/2010 | Landers et al. | 382/100 |
| 2010/0017407 A1* | 1/2010 | Beniyama et al. | 707/6 |
| 2010/0046791 A1* | 2/2010 | Glickman et al. | 382/100 |
| 2010/0076867 A1* | 3/2010 | Inoue et al. | 705/27 |
| 2010/0086192 A1* | 4/2010 | Grigsby et al. | 382/141 |
| 2010/0155476 A1* | 6/2010 | Ross et al. | 235/454 |
| 2011/0215147 A1* | 9/2011 | Goncalves | 235/383 |
| 2012/0274777 A1* | 11/2012 | Saptharishi et al. | 348/159 |

* cited by examiner

| UPC READ | MODEL RECOGNIZED | INITIALIZED | ACCUMULATION MODE | LIVE MODE |
|---|---|---|---|---|
| 0 (NO) | 1 (YES) | N/A | INCORPORATE NEW IMAGE INTO MODEL | INCREMENT MODEL RECOGNIZED COUNTER |
| 1 | 0 | CREATE NEW MODEL | CREATE NEW MODEL | CREATE NEW MODEL, INCREMENT UPC READ COUNTER |
| 1 | 1 | N/A | INCORPORATE NEW IMAGE INTO MODEL | INCREMENT UPC READ COUNTER, INCREMENT MODEL RECOGNIZED COUNTER |
| 1 | 2 (DIFFERENT) | N/A | N/A | N/A |

FIG. 8

| UPC READ | MODEL RECOGNIZED | INITIALIZED | ACCUMULATION MODE | LIVE MODE |
|---|---|---|---|---|
| 0 (NO) | 1 (YES) | N/A | RING-UP OR EXCEPTION | RING-UP |
| 1 | 0 | RING-UP | RING-UP | RING-UP |
| 1 | 1 | N/A | RING-UP | RING-UP |
| 1 | 2 (DIFFERENT) | N/A | RING-UP OR UPC FRAUD EXCEPTION | UPC FRAUD EXCEPTOIN |

FIG. 14

AUTOMATIC LEARNING IN A MERCHANDISE CHECKOUT SYSTEM WITH VISUAL RECOGNITION

CROSS-REFERENCE TO RELATED APPLICATION(S)

This application claims the benefit of U.S. Provisional Patent Application Ser. No. 61/207,141 filed Feb. 9, 2009, entitled "UPC FRAUD PREVENTION WITH ONLINE LEARNING," which is hereby incorporated by reference herein for all purposes.

TECHNICAL FIELD

The field of the present invention relates to a merchandise checkout system with visual recognition capability. In particular, the invention relates to a visual recognition system that automatically updates a database of visual data as new merchandise or existing merchandise with different packaging is purchased at a point of sale (POS) system.

BACKGROUND

There are merchandise checkout systems that use visual recognition or verification at a point of sale (POS) to prevent UPC fraud. These systems generally employ a database of images or other visual information representing merchandise that is then compared with images acquired during the checkout process. This database of visual information must be built and regularly updated to account for new merchandise and for changes in packaging of merchandise. For a checkout system that does automatic ring up, the database for visual recognition in a modern grocery store would require tens of thousands of items. Presently, a database of visual images for either system would be created and updated manually, which can be impractical because of the amount of time and effort involved. There is therefore a need for a system that can automatically create and update a visual database based on information acquired during the checkout process.

SUMMARY

The invention features a merchandise checkout system for ringing up merchandise in a grocery store or other retail store, for example. The merchandise checkout system in the preferred embodiment can include or be operably connected to a point of sale (POS) system and a barcode scanner configured to read UPC codes. In some exemplary embodiments, the merchandise check out system includes one or more imagers for acquiring an image of an object to be rung up at checkout; a database or other form of data store configured to retain records for a plurality of known merchandise, each record comprising a visual model of an item as well as the item's UPC; and a processor configured to maintain and update the data store with information about new merchandise presented for checkout. The visual model preferably includes at least one image of each piece of merchandise in the retail store as well as geometric point features extracted from images of the merchandise.

The processor in the exemplary embodiment is configured to: (a) compare the image of the object acquired at checkout to the visual model of the items in the data store; (b) recognize the object based on the overall appearance of the packaging; and (c) automatically add the acquired image to the data store if the image of the object is new, i.e., it does not match the visual model of any of the items recorded in the data store.

This enables the checkout system to dynamically and automatically build up the database of visual models with which to recognize products without the need for an administrator to manually build a database of merchandise images or manually update the database as new items are added to the store or packaging of existing merchandise changed. The processor may also automatically ring up the price of the object at the POS based on the visual recognition, thereby avoiding the need to manually scan merchandise as well.

In the exemplary embodiment, the merchandise checkout system of claim 1 employs geometric point features that are scale-invariant, preferably scale-invariant feature transform (SIFT) features. These features can be extracted from the images of the merchandise presented for checkout and stored with the item's UPC for purposes of visual recognizing the same item when it is presented later in time by a different customer, for example. The geometric point features can also be used to check the consistency between a product's packaging and the UPC read from the product to detect UPC fraud in which the UPC of a less expensive item is placed on the package of a more expensive item.

BRIEF DESCRIPTION OF THE DRAWINGS

The present invention is illustrated by way of example and not limitation in the figures of the accompanying drawings, and in which:

FIG. 8 is a table describing actions for updating a model database based on acquired transaction data;

FIG. 14 is a table describing exemplary actions during merchandise checkout based on acquired transaction data.

DETAILED DESCRIPTION. OF THE PREFERRED EMBODIMENT

Figure 1:
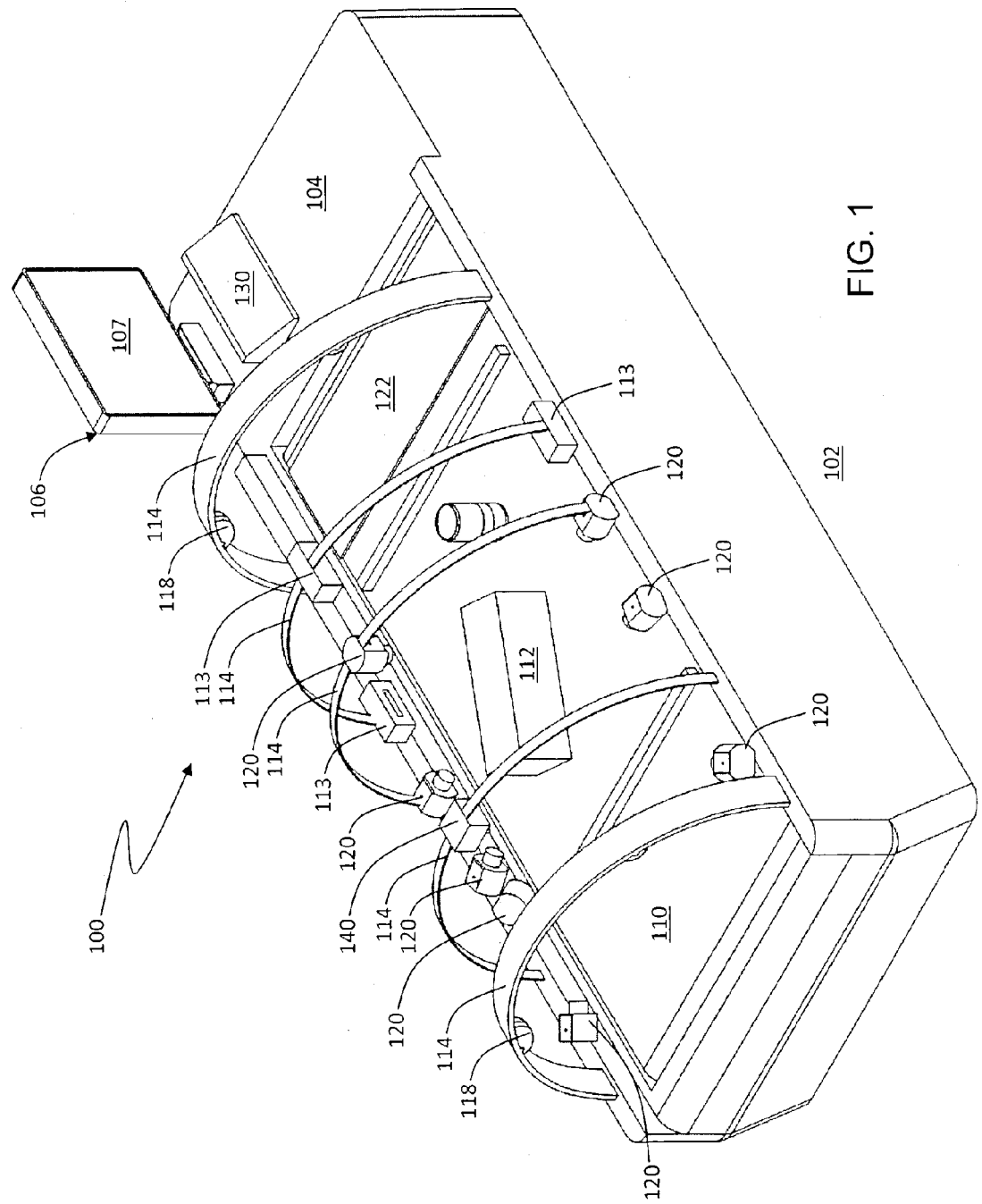
FIG. 1 is a perspective view of a tunnel system for automatically checking out merchandise.

FIG. 1 illustrates an embodiment of a self-check out system 100 that may include a checkout lane 102 of a store environment (not to scale) and a checkout counter 104. A point-of-sale (POS) (or, equivalently checkout subsystem) 106, such as a cash register, may rest on the checkout counter 104.

One or more input devices may be coupled to the POS subsystem 106. Exemplary input devices may include a barcode scanner, a scale, a keyboard 130, keypad, touch screen 107, card reader, and the like. In one embodiment, the POS subsystem 106 may correspond to a checkout terminal used by a checker or cashier. In another embodiment, the POS subsystem 106 may correspond to a self-service checkout terminal.

The checkout system 100 may further include a merchandise conveyor subsystem 110 that may be part of a conveyor belt machine well known in the supermarket industry. For convenience, hereinafter, the terms conveyor subsystem and conveyor belt may be used interchangeably. The conveyor subsystem 110 may be used to place merchandise 112 on it by a shopper. So placed, the conveyor subsystem 110 may then move the merchandise 112 in one of the following manners. In one embodiment of the present invention, the conveyor belt 110 may move continuously. In another embodiment, the conveyor belt 110 may start moving when a conventional motion detector, such as IR detector, detects a customer approaching the checkout lane 102 and sends a signal to the conveyor belt 110. In still another embodiment, a scale subsystem 122 may start the conveyor belt 110 upon detection of any weight on the conveyor belt 110. It should be apparent to those of ordinary skill in the art that the location of the scale subsystem 122 can be any where along the conveyor belt 110 including but not limited to the beginning of the conveyor belt 110. In one exemplary embodiment, the scale subsystem 122 can be located at the beginning of the conveyor belt 110 to provide an indication that there is merchandise 112 on the conveyor belt 110 waiting to be checked out. When the scale subsystem 122 detects merchandise 112 on the conveyor belt 110, it will send a signal to start moving the conveyor belt 110 and to begin the automatic checkout process.

A housing 114 may be placed over the conveyor belt 110 and cover a portion of the conveyor belt 110. As the housing 114 functions as a structure where a motion trigger subsystem, one or more visual sensors or cameras 120, one or more depth sensors 140, and a lighting subsystem 118 are mounted, it may have any dimension or shape that accommodates the flow of items therethrough. The housing may also include a UPC reader subsystem 113 configured to recognize the UPC of the merchandise 112 contained in the image. In one embodiment, the UPC reader subsystem 113 may comprise one or more conventional UPC scanners or one or more image-based UPC scanners. Within the housing 114, a motion trigger subsystem may be employed to detect the merchandise 112 moving on the conveyor subsystem 110 and past the motion trigger subsystem. The motion trigger subsystem may include sensor(s), such as conventional IR detectors. The motion trigger subsystem may be coupled to a lighting subsystem 118. Upon detection of the merchandise 112 by the motion trigger subsystem, the motion trigger subsystem may trigger the lighting subsystem 118 to light the interior of the housing 114 to provide optimum light illumination when the visual sensors 120 capture visual images.

The motion trigger subsystem may be also coupled to the visual sensors 120 and trigger the visual sensors 120 to obtain images of the merchandise 112. Triggering of the visual sensors 120 and lighting subsystem 118 may be synchronized such that the lighting subsystem 118 can provide optimum illumination. Alternatively, the motion trigger subsystem can be turned on automatically based on a signal sent by the visual sensor 120 when it detects a motion of merchandise 112 passing through. The automatic checkout process can be initiated when the motion trigger subsystem is turned on. Eight visual sensors 120 are shown in FIG. 1. However, it should be apparent to those of ordinary skill that the present invention may be practiced with any number of visual sensors.

The visual sensors (or, collectively, visual subsystem) 120 may be used to recognize the presence and identity of the merchandise 112 and provide an indication or instruction to the POS subsystem 106. The visual sensors 120 may also determine the size and shape of the merchandise 112 by analyzing the visual images of the merchandise 112. In addition, the visual sensors 120 may track which merchandise has been recognized and which has not. Each of the visual sensors 120 may be a digital camera with a CCD imager, a CMOS imager, an infrared imager, a push-broom imager which relies on the motion of the conveyor belt to generate a 2-D image of items on the conveyor belt, and the like. The visual sensors 120 may include normal lenses or special lenses, such as wide-angle lenses, fish-eye lenses, omni-directional lenses, and the like. Further, the lens may include reflective surfaces, such as planar, parabolic, or conical mirrors, which may be used to provide a relatively large field of view or multiple viewpoints.

It can also be seen in FIG. 1 that the checkout system 100 may further include a scale subsystem 122, which can be employed to weigh merchandise 112, for example, when the merchandise is fruit or vegetables. The structural incorporation of the scale subsystem 122 with the conveyor belt 110 is well known in the art and not detailed for simplicity.

Figure 2:
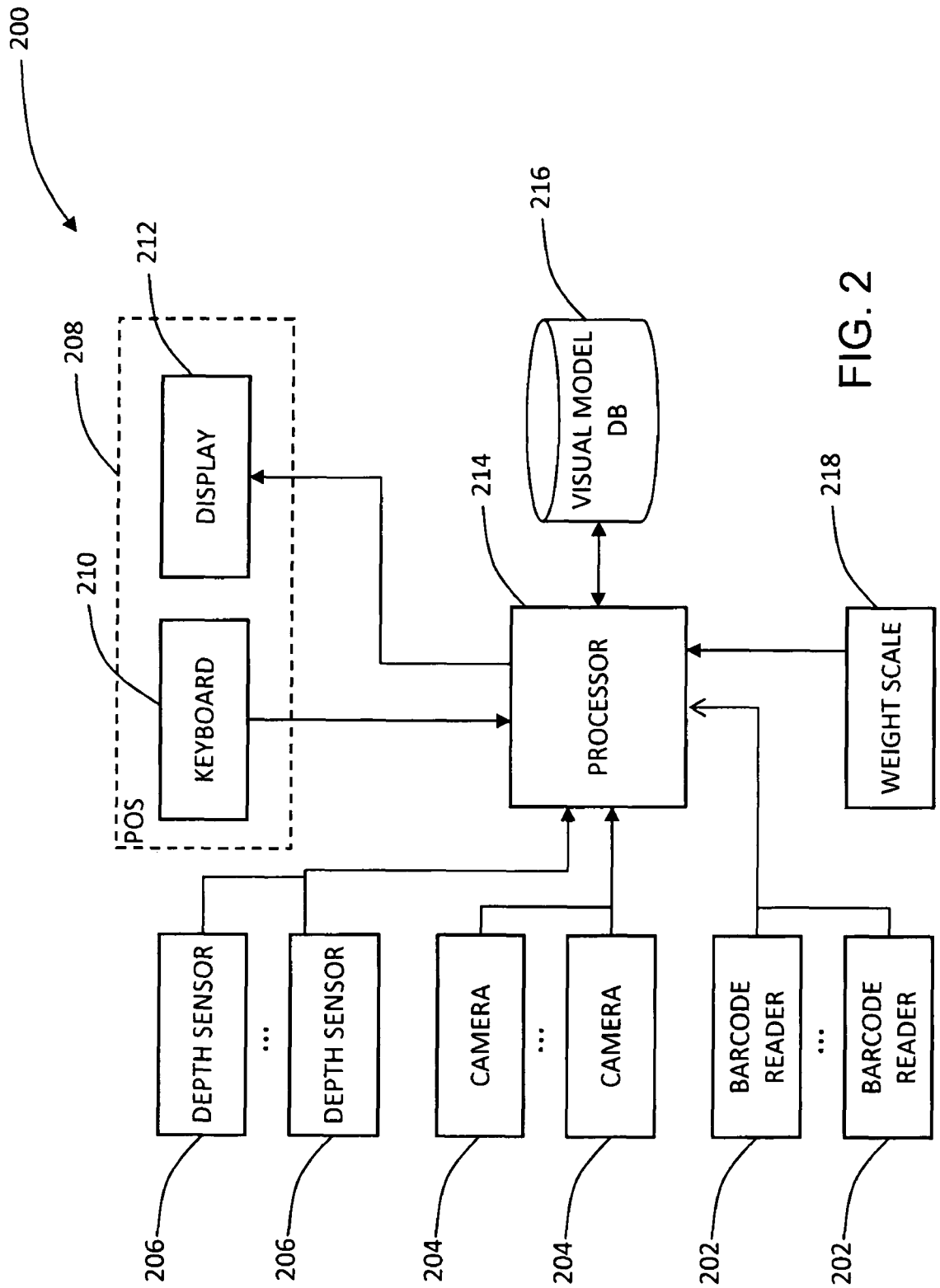
FIG. 2 is a functional block diagram of the checkout system with automatic learning.

FIG. 2 is a functional block diagram of the checkout system with automatic learning. The checkout system 200 includes one or more barcode readers or scanners 202, one or more cameras 204, one or more depth sensors 206 in the case of a tunnel-based checkout system, point of sale (POS) terminal 208 having a keyboard 210 and display 212, a processor 214, and database 216, and optional weight scale 218. The database 212 in the preferred embodiment is configured to store and update records for a plurality of items stocked in a grocery story or other retail facility, for example. Each record corresponds to an item of merchandise that can be identified based on its universal product code (UPC) and/or one or more visual models of the item. A visual model as used herein generally refers a representation of the item in terms of geometric point features, namely scale-invariant features including scale-invariant feature transform (SIFT) features described below. The visual model may further include one or more images of the item with which one can perform a correlation with an acquired image to confirm the recognition of an item. A visual model of an item may consist of a single image of one side of the item's packaging together with the geometric point features for that side, or the model may comprise multiple images and point features corresponding to some or all sides of the packaging. Depending on the implementation, one or more records may be employed to depict all possible views of an item. In accordance with the invention, records can be updated in real-time as new items, new packaging of known items, or new views of items are presented for checkout, thereby enabling the checkout system to automatically maintain and update its own merchandise database with minimal manual intervention.

Figure 3:
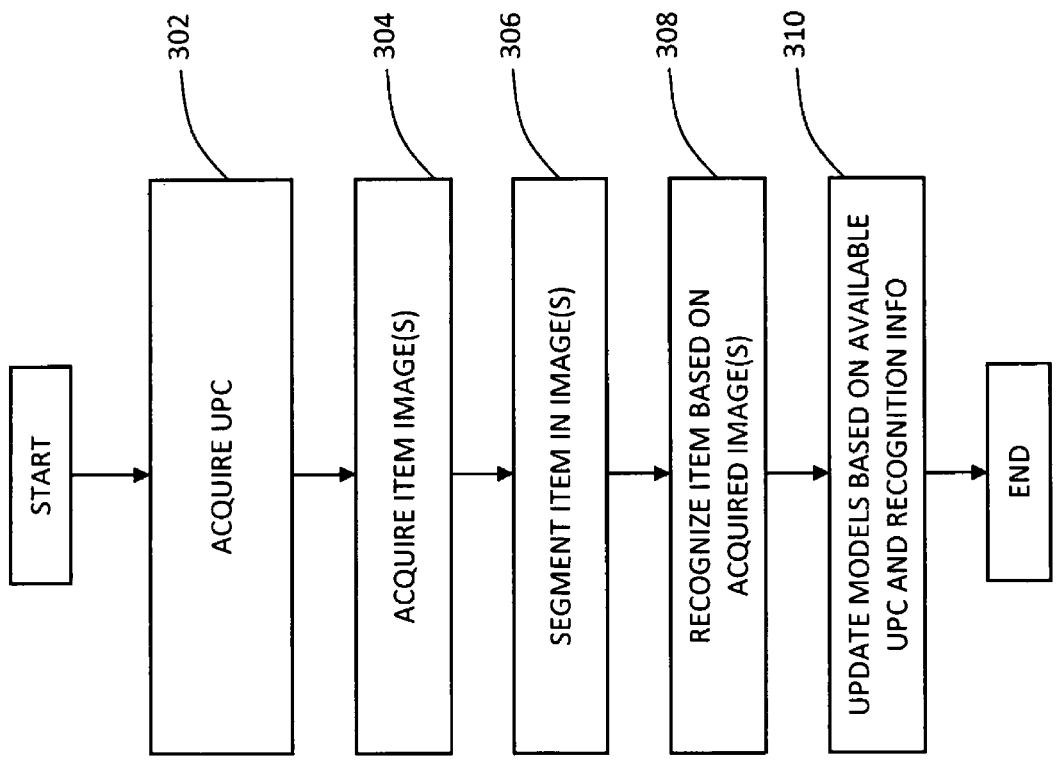
FIG. 3 is the process by which the checkout system learns new merchandise and updates the database of visual information.

FIG. 3 illustrates the general process by which a model used for visual recognition is learned. When a model is learned, a visual model is created or an existing visual model is updated. In the preferred embodiment, this process is repeated each time an item is transacted during checkout, for every item. In step 302, the automatic checkout system of the present invention attempts to acquire the UPC code of the item by one or more barcode scanners which may be laserbased or image-based scanners. In some cases, however, the UPC code cannot be acquired due to occlusion of the barcode, for example.

In step 304, the checkout system acquires one or more images of the item being purchased. In some embodiments, where multiple cameras or imagers are used, images of more than one side or one view of the item are acquired. In other embodiments, only a single image may be acquired, or only a partial view of the object may be obtained because of occlusions by other objects or because the item is partially out of the view of the camera when the image was acquired.

In Step 306, the item presented in the image is segmented from the background. There are various methods to achieve segmentation using techniques known to those skilled in the art, some of which are described herein in context of FIGS. 4A-4C.

In step 308, the item is recognized based on the one or more acquired images which are compared to the current database of visual models of items using one of various pattern recognition algorithms known to those skilled in the art. The preferred method of recognition is described herein in context of FIG. 5. During typical execution of step 308, the best matching item in the visual database is determined. Sometimes, however, no matching item is found.

In step 310, the acquired UPC, acquired image data, and item recognition may be used to create a new model or update one or more existing models used for visual recognition if necessary. In the preferred embodiment, the update occurs automatically in substantially real-time, which can enhance the ability of the present invention to recognize and ring up merchandise or increase the probability of detecting UPC substitution fraud, where the UPC barcode of a cheaper item is used to cover up the UPC barcode on a more expensive item. Depending on which information is available, and the mode of the relevant models, none, one, or multiple models may be updated.

Figure 4:
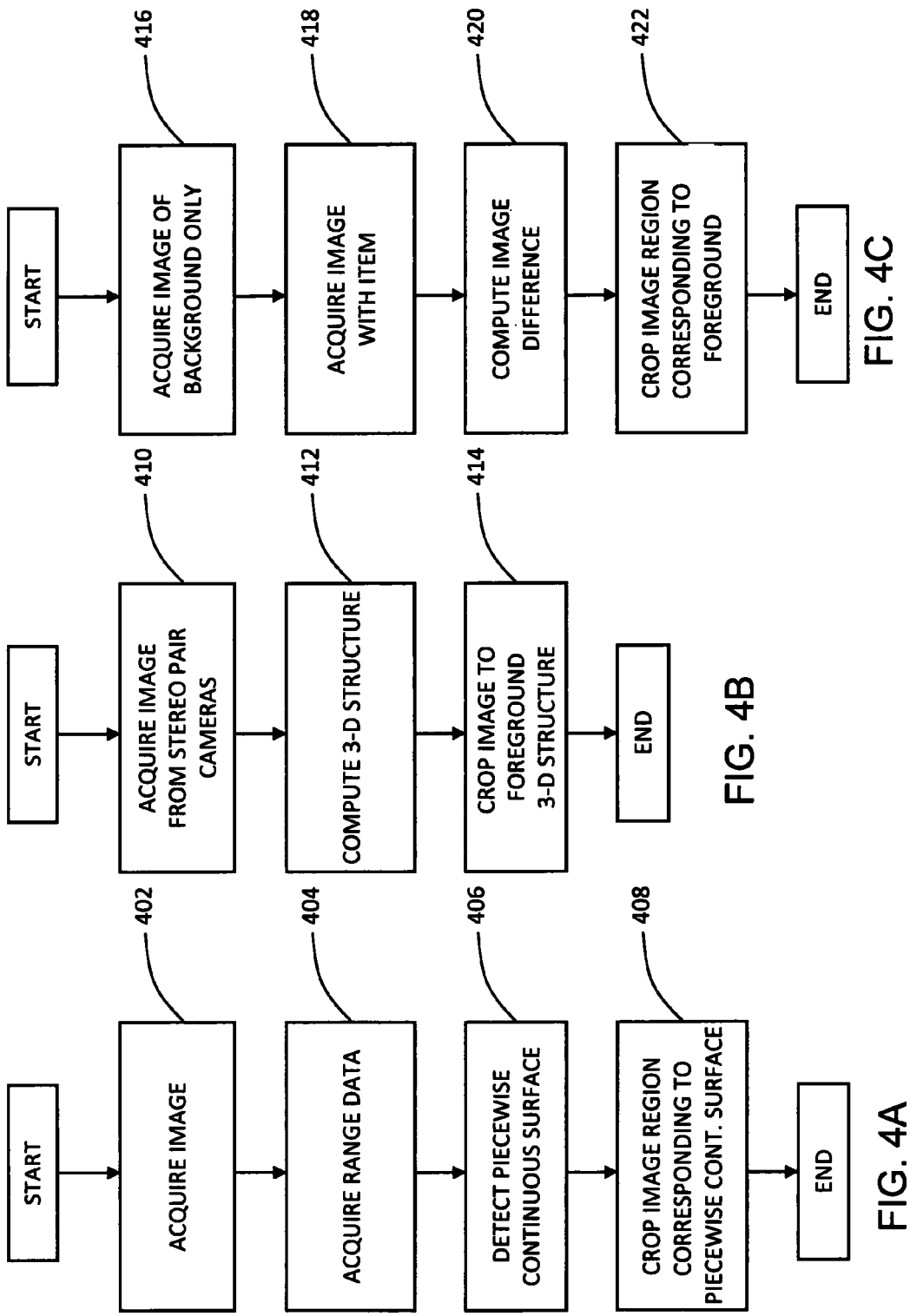
FIGS. 4A-4C are exemplary methods of image segmentation.

FIGS. 4A-4C illustrate several alternative embodiments for segmenting an image of an item. In a first embodiment, an image and range data are acquired in steps 402 and 404, respectively. The camera and the range sensor are preferably located in a known and calibrated geometry with respect to each other to enable the computation of which regions of the image correspond to particular range/depth coordinates. In step 406, the range data is processed to detect the extent of the foreground piecewise continuous surface which represents the merchandise standing out above the background. In step 408, the image region corresponding to the extent of the piecewise continuous foreground surface is cropped, thereby resulting in a segmented image of the item with the background removed.

An alternate embodiment using known techniques for 3-D structure estimation from stereo input is described in FIG. 4B. In step 410, images of merchandise on a conveyor belt, for example, are acquired with two or more cameras. Preferably, the cameras' relative geometry is known and calibrated to enable calculation of depth coordinates via geometric triangulation. In step 412, the 3-D structure is computed for the whole scene using techniques known to one skilled in the art, such as the method of "Structure Computation" described in Chapter 12 of the book entitled "Multiple View Geometry in Computer Vision" by Richard Hartley and Andrew Zisserman, published by Cambridge University Press, April 2004. In step 414, the image is then cropped to retain only the image area corresponding to the foreground 3-D structure, namely the item being purchased.

In FIG. 4C, yet another embodiment for image segmentation is described. In step 416, an image is acquired of the background without the item being present. In step 418, a second image is acquired with the item present in the image. In step 420, the difference between the two images is computed, thereby subtracting the background. In step 422, the image is cropped to retain only the portion corresponding to the foreground item (where the difference of the image pixels exceeds a threshold). A variation of this idea can, for example, employ several images of the background to build up a statistical model of the background image and that statistical model used to define the threshold pixel-by-pixel that must be exceeded for an image pixel to be deemed part of the foreground. Also, morphology-based image processing techniques such as erosion and dilation can be applied to eliminate small errors due to noise and estimate a clean, contiguous foreground region.

During acquisition of item images, it may happen that the side of the item being imaged is not oriented completely parallel to the camera. In some embodiments, the image of the item is rectified, that is, transformed to give the appearance of the item face being parallel to the camera, and this transformation can be computed in one of several ways. One method, known to those skilled in the art, is to compute the rectifying homography of the surface of the side of the item, based on its relative position and orientation with respect to the camera. The relative position and orientation can be obtained, for example, from the surface estimation generated from processing depth/range data, or from the 3-D structure estimated from stereo image data. Another method to estimate a rectifying homography, for cases where the item imaged has a rectangular shaped side, is to detect the four boundary edges of the segmented item image, and use perpendicularity constraints amongst the detected edges to solve for the homography. In other embodiments, rectification of the item images is not necessary because rectification is not necessary for the method of item recognition to function well, and the process of updating a model of an item with a newly acquired image of the item, via the process of merging (stitching) images and merging visual features (to be described in detail in reference to FIG. 12) also does not require the images to be rectified. In some embodiments, a rectified image is preferred for display purposes, when an image of a recognized item is to be presented to a customer or store attendant for verification of loss prevention purposes. Note also that in some embodiments it may not be necessary to perform image segmentation to segment the item in the image. For example, if the background is textureless (such as the black conveyor belt), no features would be extracted from the background, and the visual recognition process and model creation and updating processes can be executed without need for segmentation.

Figure 5:
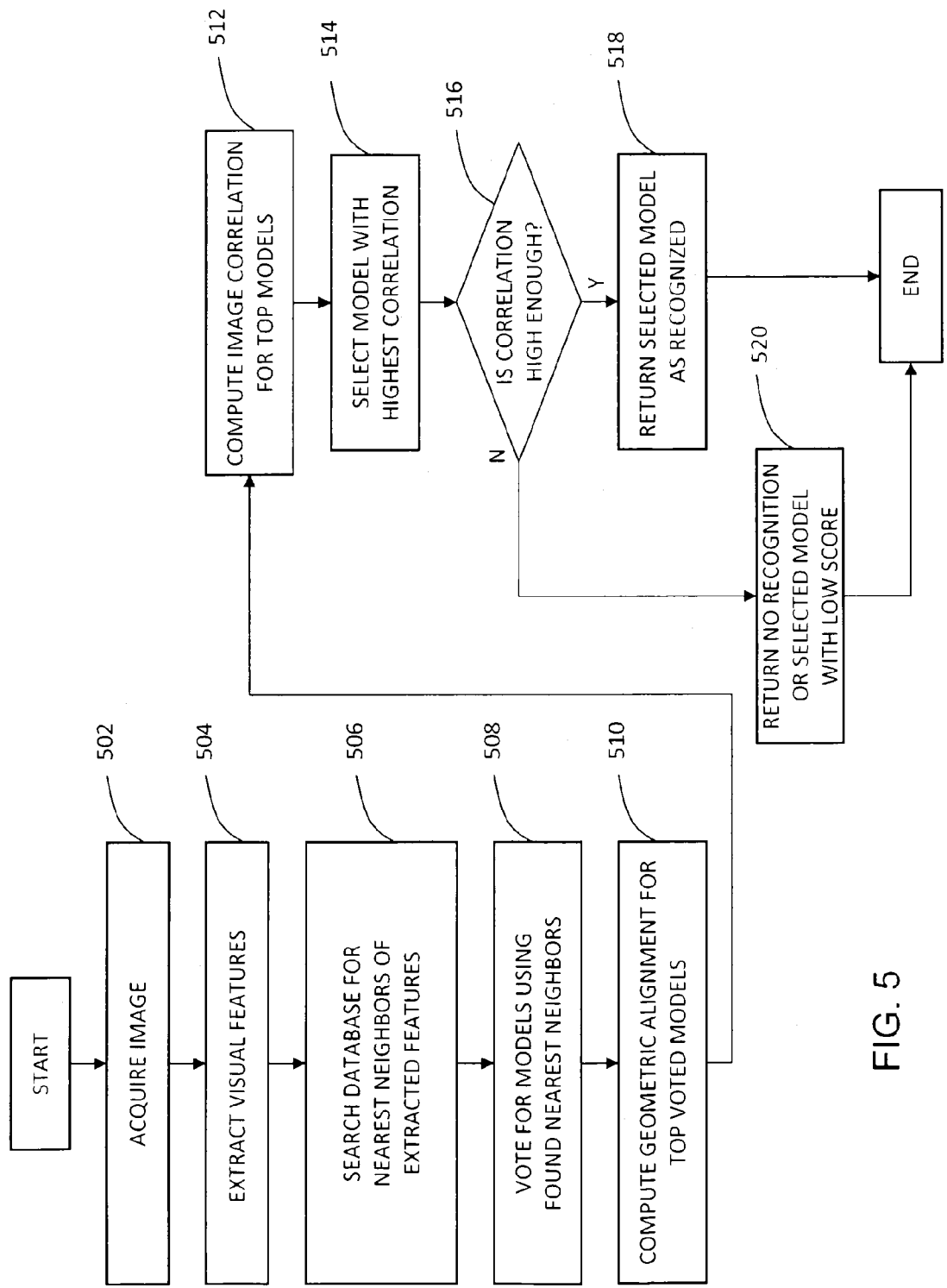
FIG. 5 is an exemplary method of recognizing an item in an image using a visual model database.

FIG. 5 illustrates a method of recognizing an item in an image using a visual model database. The method is similar to those described in U.S. Pat. No. 6,711,293 entitled "Method and apparatus for identifying scale invariant features in an image and use of same for locating an object in an image", issued Mar. 23, 2004, and U.S. Pat. No. 7,100,824 entitled "Systems and methods for merchandise checkout", issued Sep. 5, 2006, both of which are incorporated by reference herein. In step 502, the image of the merchandise is acquired. In step 504, geometric point features—preferably scale-invariant feature transform (SIFT) features—are extracted, feature extraction generally referring to the detection of keypoints and computation of a local descriptor for each keypoint. In step 506, the visual model database is searched to identify the nearest neighbors of the extracted features, the nearest neighbor being a geometric point feature corresponding to a visual model that has a local descriptor most similar to the local descriptor of the extracted feature. In one embodiment, local descriptors are represented by a 128 dimensional vector of unit norm, and the similarity of local descriptors is computed by computing the Euclidean dot product between vectors. In step 508, votes are accumulated for models in the database, each nearest neighbor found in step 506 adding a vote to the visual model to which it corresponds. In step 510, a geometric alignment between the visual model and the acquired image is computed for the one or more models with the most votes. The geometric alignment is computed by methods known to one skilled in the art, such as by computing the numerical coefficients of a homography transform that minimizes the sum of squared differences between the coordinates of the features of the acquired image transformed by the homography transform and the coordinates of the corresponding nearest neighbor features of the model. In step 512, a correlation score or confidence score is computed for the top visual models with good geometric alignment. In one embodiment, the score is computed by first transforming the acquired image with the computed geometric alignment, and then computing a normalized sum of squared differences between the pixels of the aligned image and the image corresponding to the top matching model. The score has a highest value of 1.0 if the alignment is exact and the pixel intensities of the two images are exactly the same (or linearly related). The score has a low value of zero if the two images are completely uncorrelated. In step 514, the visual model with the highest correlation or confidence score is selected as the matching model. In step 516, the correlation or confidence score of the matching model is compared to a predetermined threshold. If the score exceeds the threshold, the model is confirmed as being recognized (step 518). If the score does not exceed the threshold, no recognition result is returned, or the matching model is returned but with a low confidence score, as shown by step 520.

Figure 6:
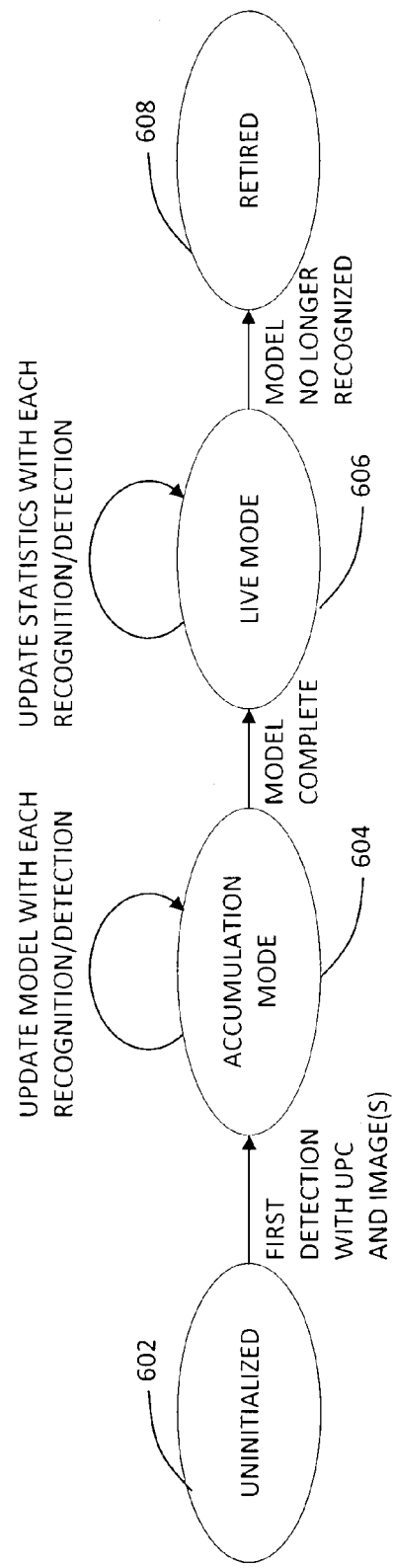
FIG. 6 is a state diagram illustrating the modes of a visual model.

FIG. 6 depicts the modes of a visual model in the visual model database. In one embodiment, the database contains at least one model for each item in the retail store. In another embodiment, the database contains models for only items selected or determined to be of interest. Also, since the visual appearance of an item's packaging may change occasionally (due to promotions, special seasonal packaging, advertising campaigns, or logo and branding redesign and redefinition), more than one model may be associated with the same item and same UPC; one model per design of the visual packaging.

In mode 602, the model of an item is initialized. In some embodiments, initialization occurs when the item with the UPC is first observed. In another embodiment, the model consisting only of the UPC (and no visual image data) may be initialized as part of a batch process prior to observing any items so as to identify items for which visual models with be created.

Once an item's barcode is read, and at least one image that is usable for recognition is acquired, but no recognition is obtained (either because there are currently no images available for recognition, or the image did not match the model in the database), a new visual model is initialized and the new model enters the "Accumulation mode" (mode 604). A visual model stays in Accumulation mode until it is deemed complete enough to be used for item automatic ring-up during a transaction, i.e., where the ring-up can be based solely on a visual recognition of the packaging without reading the UPC. When this occurs the model transitions to the "Live mode", as depicted in mode 606.

In one embodiment, where there are enough cameras in the checkout system to acquire images of all sides of an item (for example, the 6 sides of a package), the model may go immediately from Accumulation mode to Live mode. In another embodiment, where not all sides of an item's packaging are acquired during the first transaction of the item, the model may stay in Accumulation mode until all sides of the package are imaged in subsequent transactions of the same item. In yet another embodiment, each side of a package has its own separate visual model, and as soon as a new side is imaged (one which does not match the model of any other side in the database), that single side model can go directly into Live mode. In yet another embodiment, each side of a package has its own separate model, but each such model goes through a period in Accumulation mode to enable subsequent observations of the same side of an item's package to be used to update or enhance the model. This embodiment is useful when images of items cannot be guaranteed to depict an entire side of an item without occlusions, as may happen when images are acquired at a self-checkout system where items are scanned manually by a customer, or when images are acquired at a regular checkout lane where a cashier manually scans items, or when images are acquired by a retail fraud prevention system such as the LaneHawk sold by Evolution Robotics Retail, Inc. and described in U.S. Pat. No. 7,100,824 entitled "System and methods for merchandise checkout" issued Sep. 6, 2006.

Once in Live mode, a model is used during a transaction both to ring up an item without requiring the UPC to be read, and also as a means to detect and prevent fraud. For example, if the UPC from the barcode reader is different from the UPC of a visually recognized item, a cashier or store manager may be alerted to the possibility of UPC barcode substitution fraud, where the UPC barcode of a less expensive item is used to cover up a more expensive item's barcode.

Because the visual appearance of item packaging often changes and is updated, in order to avoid the visual database growing in size indefinitely, models in Live mode are monitored. If a model has not been visually recognized for a determined time period, it is deemed outdated, and goes to mode 608, namely the "Retired mode". A model in Retired mode can then be removed from the visual database.

Figures 7A, 7B:
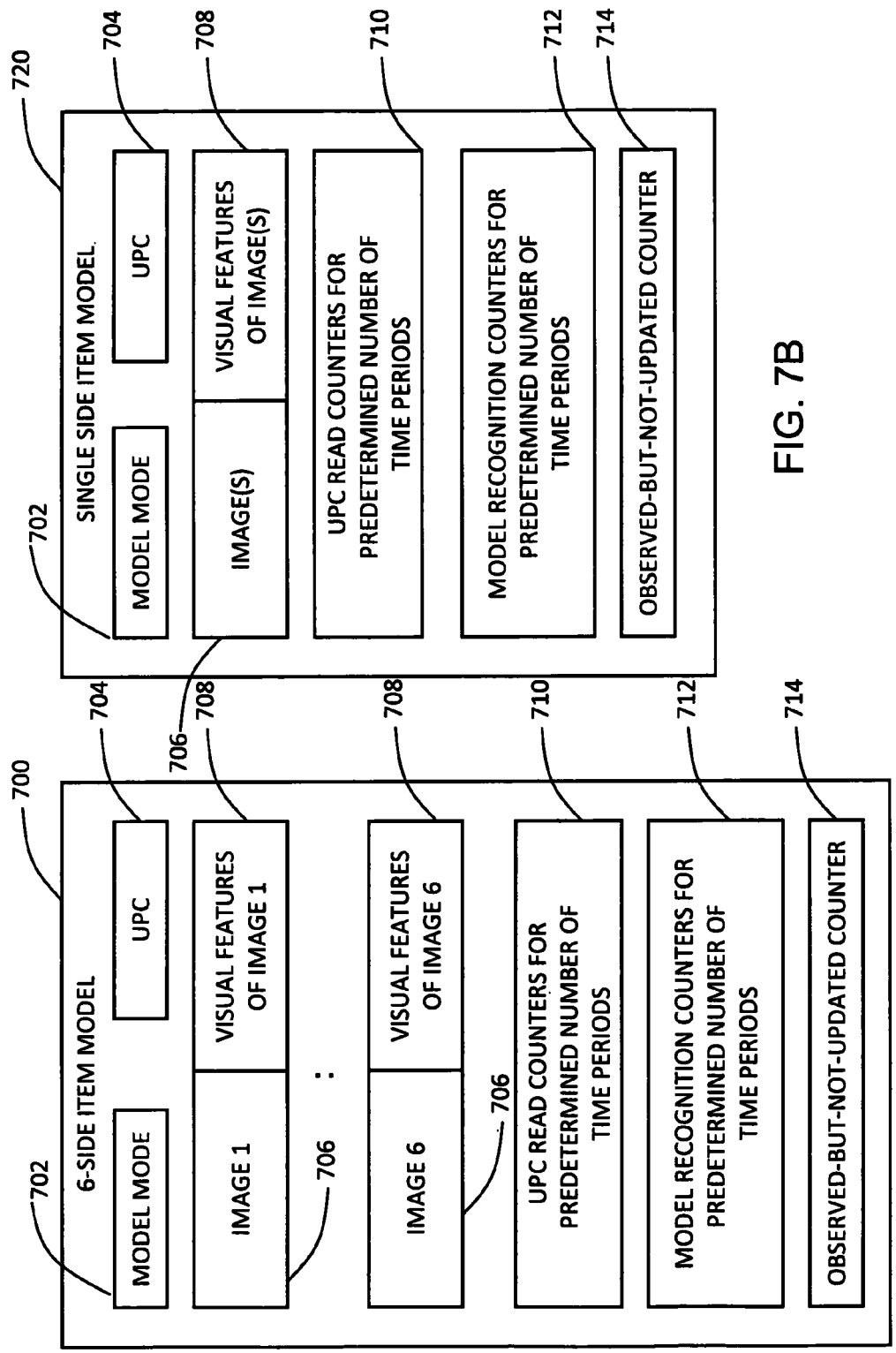
FIGS. 7A-7B illustrate two exemplary fields of a visual model.

FIGS. 7A and 7B depict two possible embodiments of the fields of a record in the visual model database. FIG. 7A depicts the record 700 of a visual model and its fields when a single model encompasses all sides of an item's package. The fields for a model mode variable 702, UPC 704, images or pointers to images 706 depicting the 6 sides of an item, the geometric point features 708 associated with each image of the item, and detection and recognition statistics. The detection and recognition statistics may comprise, for example, a first periodic counter 710 for a predetermined number of days where each counter represents the number of times the model's UPC was read that period, as well as a second periodic counter 712 for a predetermined number days where each counter represents the number of times the model was visually recognized that day (for example, a period may account for a day and the counts retained for the last 7 days). These fields may be used to determine when a model becomes outdated, as will be described below. The record may also contain an observed-but-not-updated counter field 714, which may be used to determine when a model can transition from Accumulation mode to Live mode, as will be described in more detail below.

FIG. 7B depicts another record 720 with the same fields as that shown in FIG. 7A with the exception of the image set 706, which now consists of one or more images of a single side of an item's package as well as the geometric point features 708 corresponding to that package side. The fields include a model mode, UPC; single image (for the case where a high quality view of the side of an item can be obtained from a single image), or multiple images (for the case where a high quality view of the side of an item has to be built up using information from multiple image observations of the item side); the corresponding geometric point features, and detection and recognition statistics fields.

FIG. 8 describes in more detail a preferred method of updating the model database with an acquired UPC, image data, and recognition information for an item being transacted, which corresponds to step 310 of FIG. 3. There are several possible scenarios to consider. The UPC of the item may or may not have been successfully read. Those situations will be denoted UPC=1 and UPC=0, respectively. The item may or may not have been visually recognized, these situations being denoted REC=1 or REC=0, respectively, or it may have been recognized but the visual model does not correspond to the UPC read the packaging, denoted REC=2. Likewise, the visual models to be updated may have been initialized, in Accumulation mode, or in Live mode. FIG. 8 describes the action performed to update the model under all possible scenarios.

Figure 12:
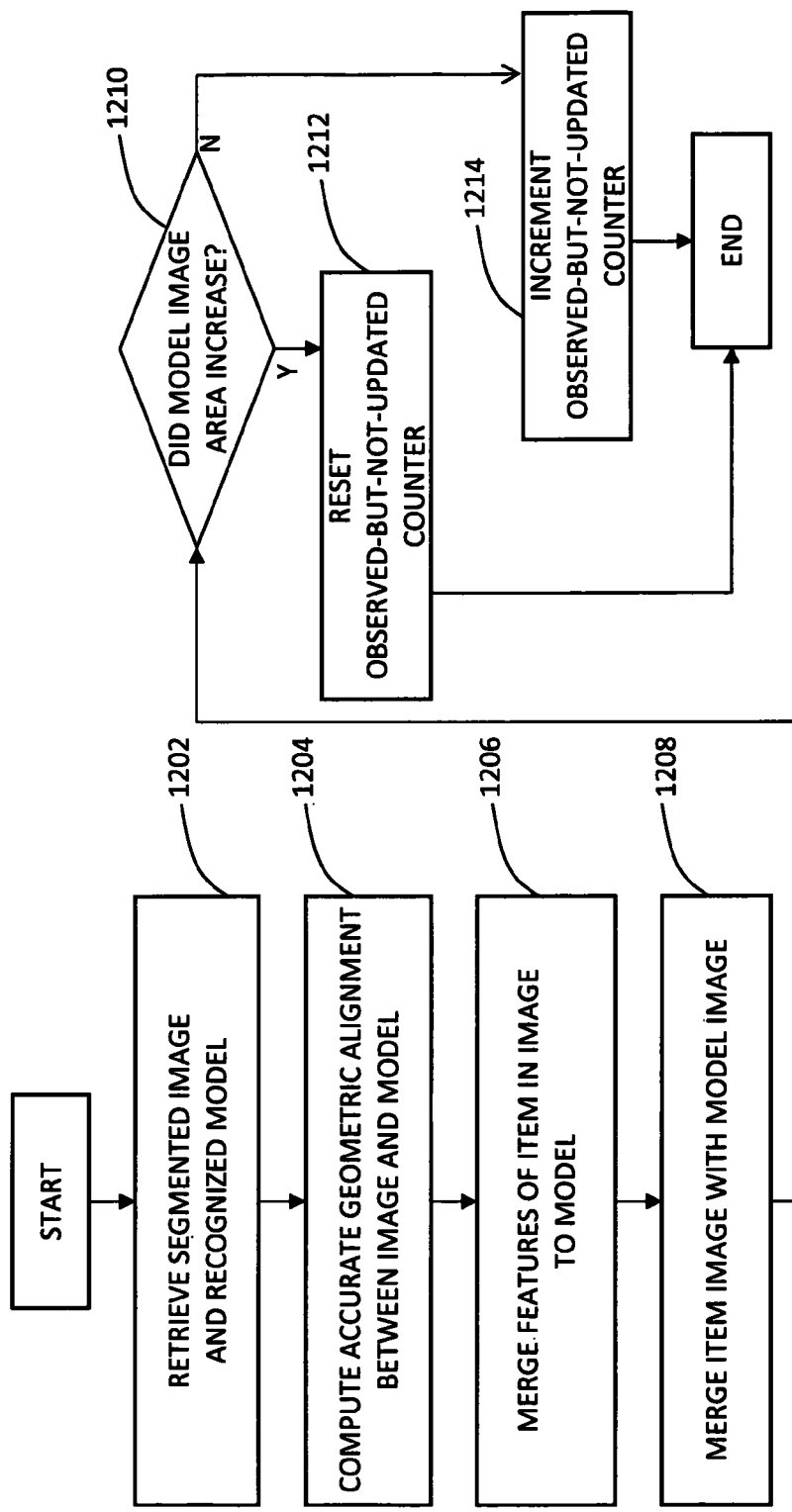
FIG. 12 is an exemplary method of updating a model with new visual information.

When UPC=0 and REC=1, and if the model is in the Accumulation mode, the acquired image with which the recognition was obtained is incorporated into the model, which is described in more detail in context of FIG. 12. If the model is in the Live mode, then the periodic counter for recognition is incremented by one for the current day.

When UPC=1 and REC=0, regardless of the mode of the model, a new model is created since no existing model in the database matched the acquired image, thereby creating a new visual model representing a side of a new package or a new side of an existing package. However, if there are one or more existing visual models with the same UPC that are in Live mode, their UPC periodic counters are incremented for the current day. Creation of a new model includes generating a record with the UPC, the acquired image or images, the geometric point features associated with one or more images, initializing the bar code read counts to zero, initializing the model recognition counts to zero, and initializing the observed-but-not-updated counter to zero.

When UPC=1 and REC=1, and if the recognized model is in Accumulation mode, the one or more acquired images with which the recognition was obtained is incorporated into the visual model, as described in context of FIG. 12. If the recognized model is in Live mode, then both the recognition counter and UPC read counter are incremented for the current day. All other models in Live mode with the same UPC but which were not recognized also have their UPC read counter incremented.

When UPC=1 and REC=2—signifying that the recognized model has a UPC different from that read from the item—then UPC substitution fraud is likely to be occurring and the database is not updated.

Figure 9:
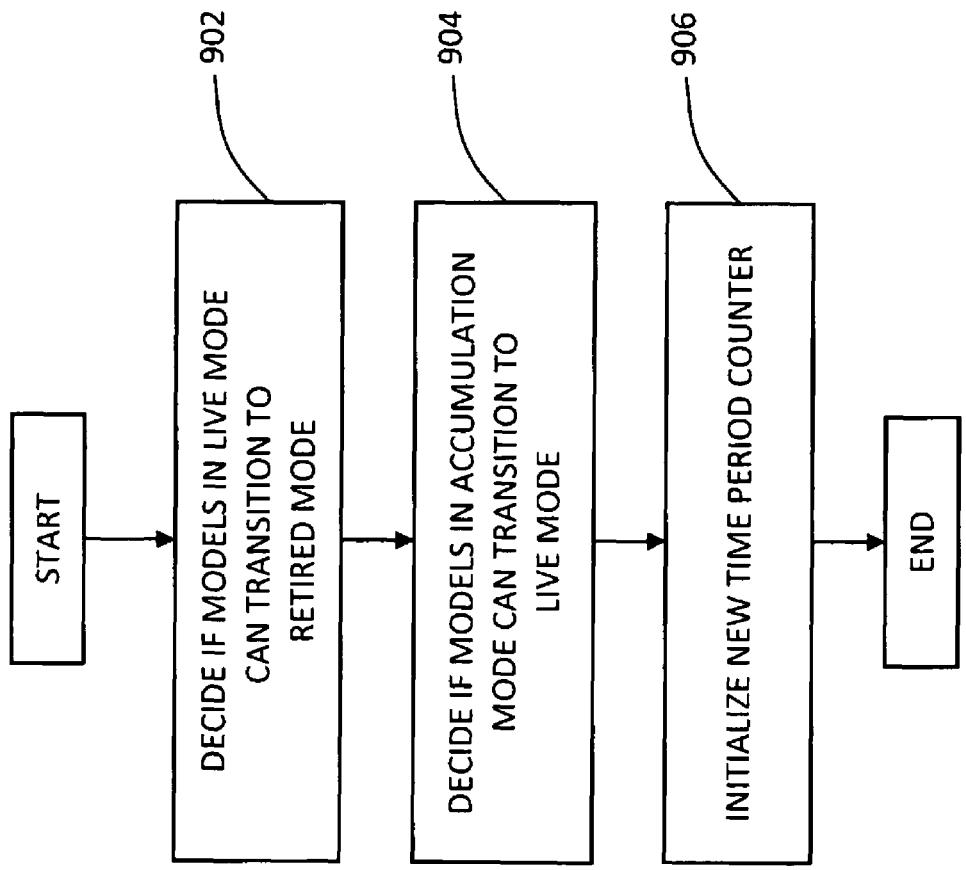
FIG. 9 is an exemplary method for periodically updating the mode of visual models.
Figure 10:
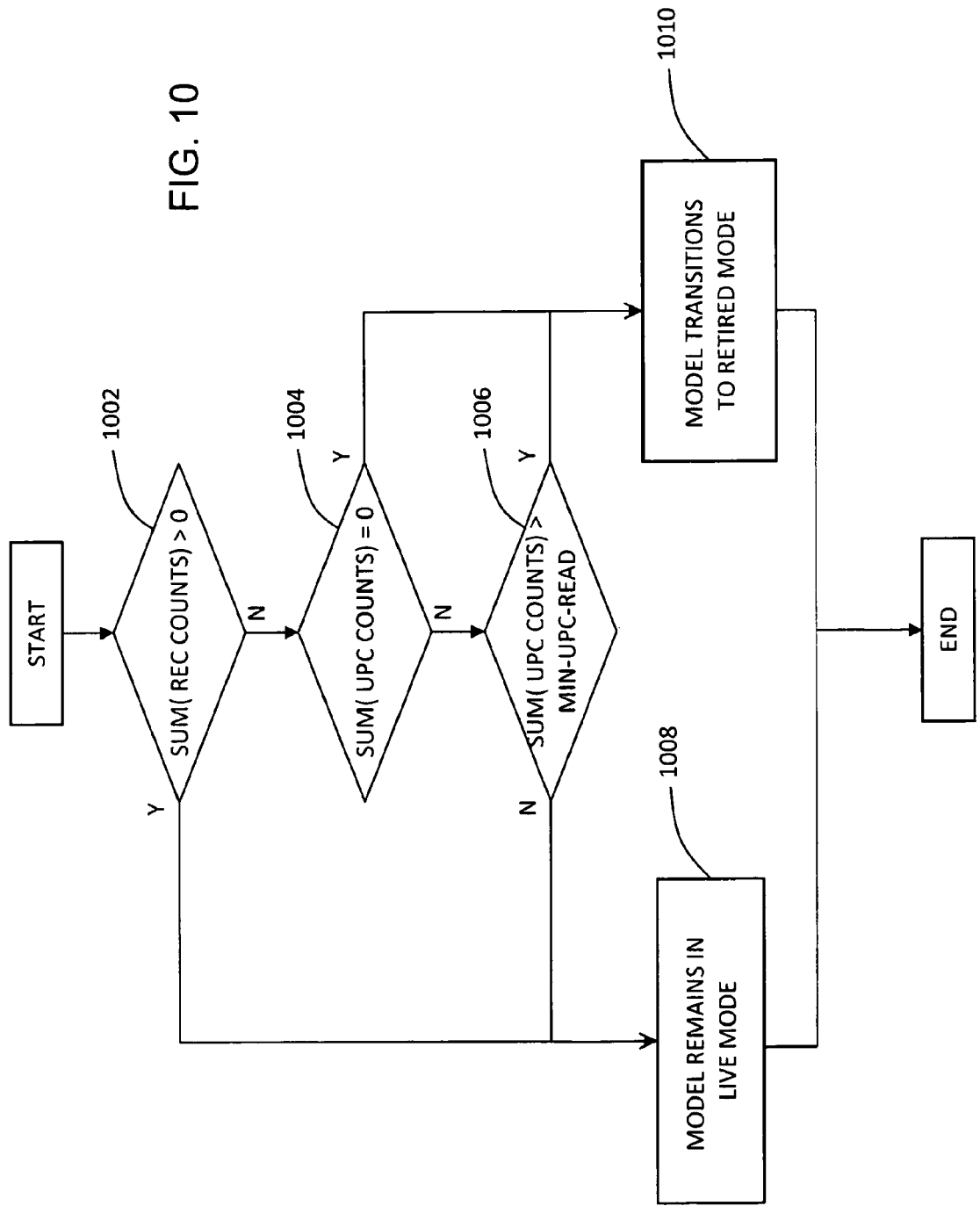
FIG. 10 is an exemplary method for transitioning from Live mode to Retired mode.
Figure 11:
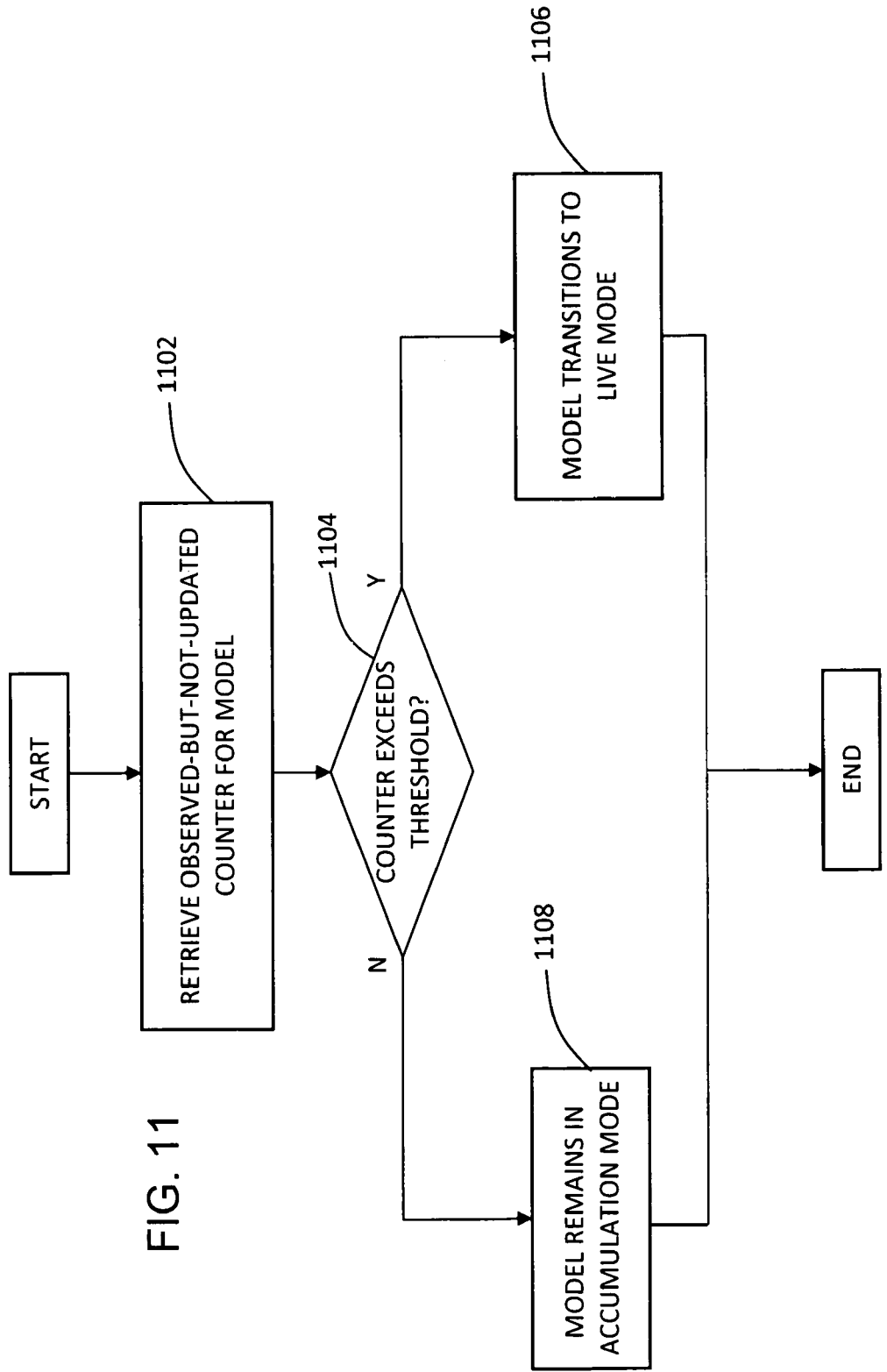
FIG. 11 is an exemplary method for transitioning from Accumulation mode to Live mode.

Besides all the visual model database updating that occurs whenever an item is transacted described above (FIG. 8), the model database is also revised periodically, for example, at the end of each day, to determine (a) if there are any models in Accumulation mode that can transition to Live mode, and (b) if there are any models in Live mode that can transition to Retired mode. FIGS. 9, 10, and 11 describe those processes.

FIG. 9 describes the process of periodically updating or otherwise revising the model database. At a chosen periodic rate (e.g., midnight each day), the following process is executed to revise the database. In step 902, all the models that are in Live mode are analyzed to determine which ones may go to Retired mode (discussed with FIG. 10). In step 904, all the models that are in the Accumulation mode are analyzed to determine which ones may go to the Live mode (discussed in detail when describing FIG. 11). In step 906, the periodic counters for UPC counts and recognition counts are updated (outdated counter discarded and counter for new day initialized to zero counts).

FIG. 10 describes the process to decide if a visual model that is in Live mode can be retired. The process is executed for all models currently in Live mode. In step 1002, the sum of all the recognition counters for the entire period being monitored is compared to zero. If the value is greater than zero, then the model is still being actively recognized, and so the model stays in Live mode in step 1008. If the value is zero, then in step 1004, the sum of all the UPC read counters for the entire period being monitored is compared to zero. If the value is zero, then the item is deemed to be discontinued and the model transitions to Retired mode in step 1010. If the value is greater than zero, then in step 1006, the sum of all the UPC read counters is compared to the min-UPC-read threshold (for example, 20). If the summed value exceeds the min-UPC-read threshold, then there have been sufficient UPC reads without any visual recognitions of that visual model to decide with a high degree of certainty that the model is no longer useful (indicating, for example, that the item packaging has changed). In this case, the model transitions to Retired mode, step 1010. If the summed value does not exceed the threshold, then there have not been sufficient transactions of the item to determine that the model is no longer valid, and so the model stays in Live mode, step 1008. Note, however, that one skilled in the art will appreciate that there are various other ways of deciding when to transition from Live mode to the Retired mode, including, for example, methods for adapting the length of periods or the number of periods that a model is monitored for, to take into account the rate at which the associated item is sold.

FIG. 11 describes the process of deciding which visual models in Accumulation mode can transition to Live mode. The process is executed for all models currently in Accumulation mode. The observed-but-not-updated counter is retrieved 1102 and compared 1104 to a predetermined threshold (for example, 9). The observed-but-not-updated counter represents the number of times a visual model has been recognized since the visual model was last updated with one or more acquired images. The counter generally has a low value when the model is incomplete and is updated frequently with newly acquire visual data. The counter will reach higher values when the visual model depicts one or more complete sides of the item's packaging and updates are less frequent or non-occurring. If the counter exceeds the threshold, then the model can go to Live mode in step 1106. If the counter does not exceed the threshold in decision block 1104, the model remains in Accumulation mode in step 1108.

FIG. 12 describes the method of incorporating information from a new image into a model in Accumulation mode. In step 1202, an acquired image (or segmented if necessary) of an item and recognized model that matches the acquired image are retrieved or otherwise provided. In step 1204, an accurate geometric alignment between the image and the model is computed. In step 1206, the geometric point features are merged with the geometric point features of the model. This is done by determining which features of the image (that are part of the imaged item) are not already present in the list of features of the model, and appending those new features to the list. In step 1208, the actual item image is merged (or stitched, for example) with the image of the model. This is done by augmenting the image pixel size of the model's image so that the pixel support for the new features present in the new image not present in the model can be geometrically aligned with the model's image (the geometric transformation was already previously computed), and incorporated into the model image with extended dimensions. In step 1210, a check is made to determine if the model image area increased, that is, whether there were new pixels added to the model image in step 1208. If the area did increase, then the observed-but-not-updated counter for the model is reset to zero in step 1212. This indicates that the visual model is still being actively updated with new image information and the model should stay in Accumulation mode. If the area did not increase, then the observed-but-not-updated counter for the model is incremented by a count of one in step 1214. This indicates that the model did not need to be updated despite the occurrence of the recognition of the model, thus providing further evidence that the model may be complete enough to transition to Live model.

Figure 13:
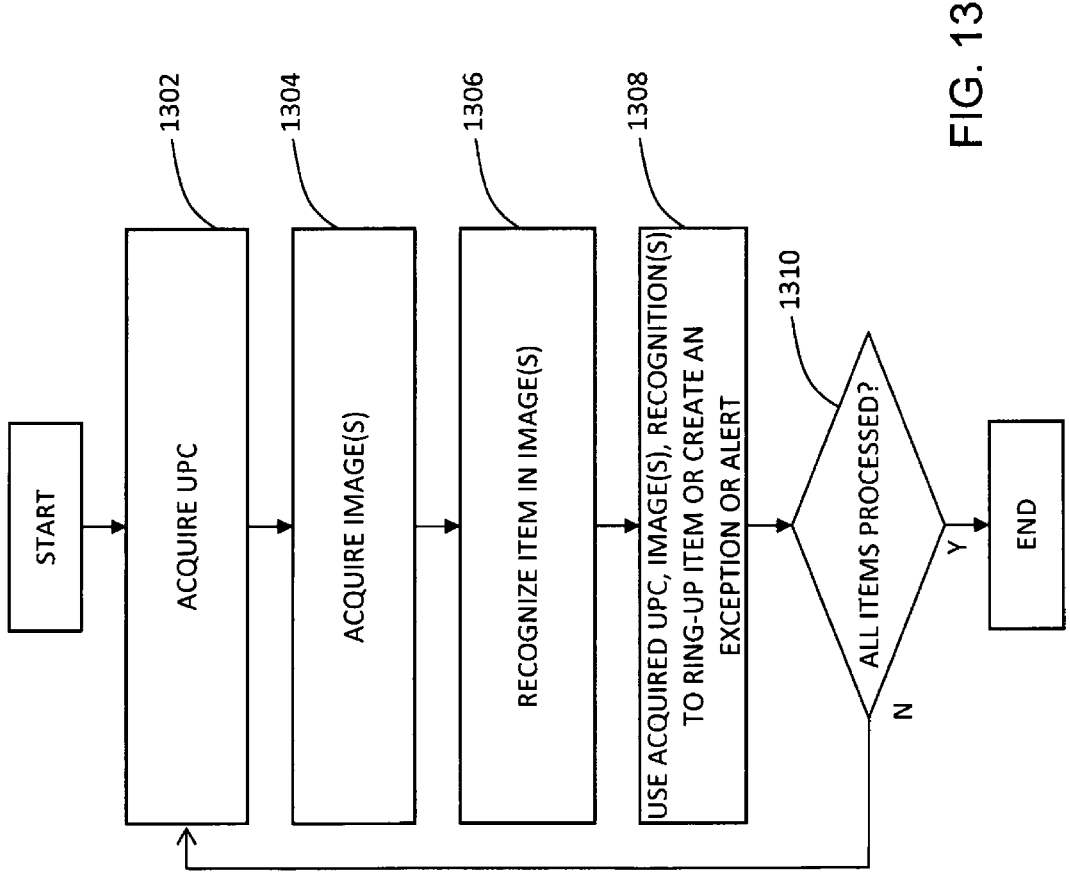
FIG. 13 is an exemplary ring up procedure.

FIG. 13 describes the general procedure for utilizing the visual model database during item transaction and ring-up. In step 1302, the UPC of a new item being transacted is acquired. In some situations, due to occlusions by other items or improper placement of the item, it may not be possible to read the UPC. In step 1304, one or more images of the item are acquired. In step 1306, the acquired image(s) are used to recognize the item using the visual model database, as described above. In step 1308, the acquired UPC, image, and recognition information is used to either ring-up the item or create an exception/alert to the customer, cashier, or other store personnel, as described in context of FIG. 14 below. In step 1310, the process ends if all items have been transacted, or returns to step 1302 to process the next item in the transaction.

FIG. 14 describes how to use the acquired UPC, acquired image data, and recognition information to either ring-up the item or create an exception or alert. The action taken depends on the particular scenario occurring. The UPC may (UPC=1) or may not (UPC=0) have been read. Likewise, the recognition may (REC=1) or may not (REC=0) have been successful, or may not match the read UPC (REC=2). Furthermore, the action may depend on whether or not the model recognized or related to the UPC was in Accumulation mode or not. For the cases where UPC=1 and (REC=0 or REC=1), the item may be rung-up irrespective of which mode the relevant model or models are in, since the item barcode was reliably read, and the recognition did not negate the barcode read. If UPC=1 and REC=2 (where the model recognized does not correspond to the barcode read), there is a high likelihood that UPC substitution fraud is occurring, and so a UPC fraud exception or alert can be issued. This exception or alert can, for example, lock or pause the transaction so that the transaction cannot proceed until a cashier or other store personnel determines whether fraud is occurring or not, takes necessary corrective actions, and manually overrides the locked transaction. When the model is in Live mode, the exception or alert is always executed. When the model is in Accumulation mode, the exception or alert is executed if the recognition is of high enough confidence, or a ring-up can be allowed if the confidence does not exceed a threshold. Likewise, for the case where UPC=0 and REC=1, the item is always rung up if the model is live, but if the model is in Accumulation mode the ring-up can occur only if the recognition is of high enough confidence, otherwise an unrecognized item exception or alert can be generated which requires the attention of a cashier or other store personnel for the transaction to proceed.

Figure 15:
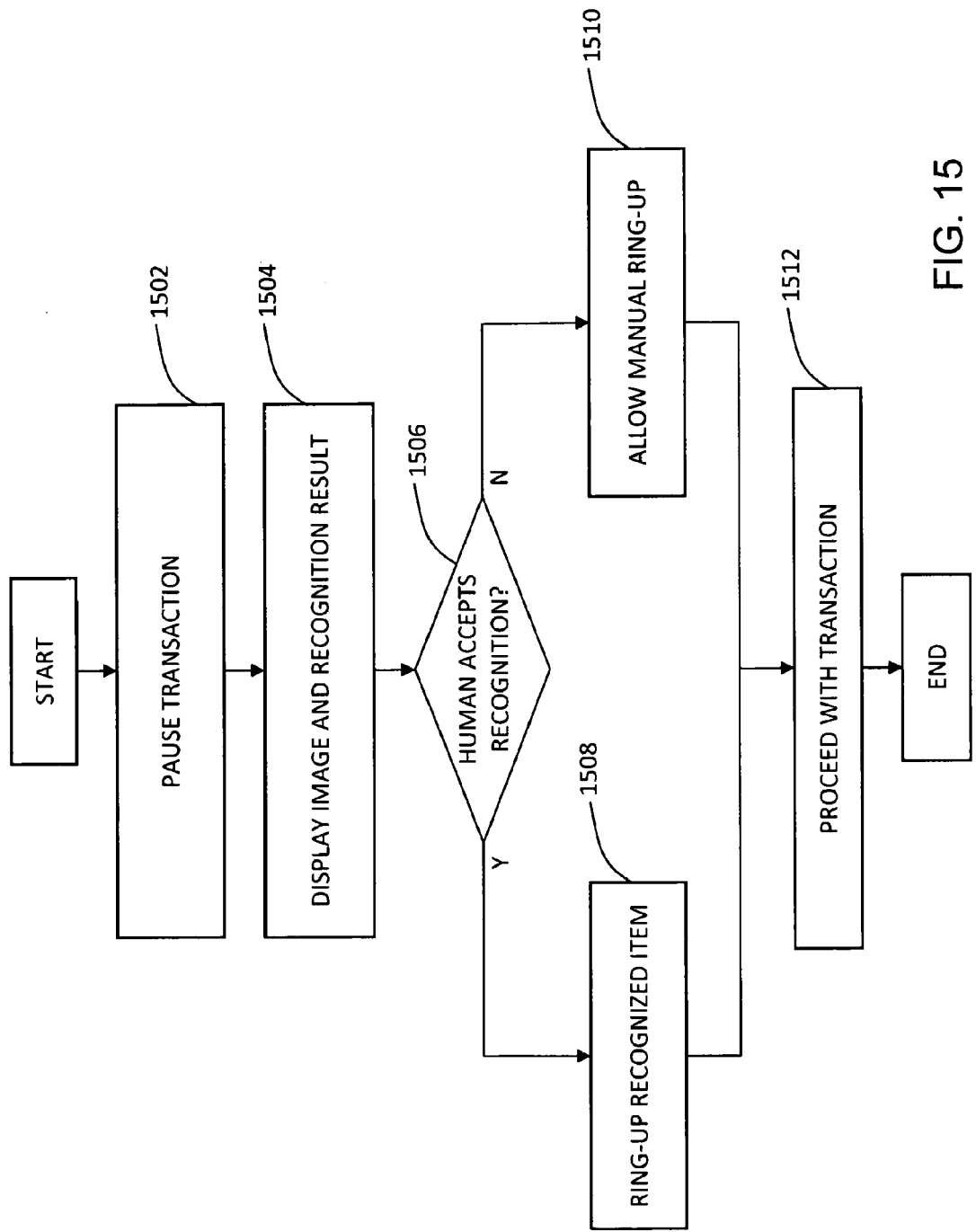
FIG. 15 is an exemplary method of enabling human intervention during merchandise checkout.

FIG. 15 describes an exemplary embodiment for a procedure to enable human interaction when the item cannot be reliably recognized, as in the case where there was no UPC read, but the item was visually recognized (but with a recognition of low confidence). The process can also be used as a means to deal with an exception or alert, such as a UPC fraud alert. In step 1502, the transaction is paused. This may involve stopping any conveyor belts from moving, illuminating a beacon to alert the cashier or other store personnel, or sounding an alarm. In step 1504, the image that led to the item recognition, as well as the recognized model information (an image of the model, the UPC, and or the item description) is displayed. The display may occur on the cashier's POS system, or on an attendant's remote terminal, for example. In step 1506, the system waits for the cashier or store personnel to indicate (with a button press, verbal command, or by scanning a barcode command card) whether or not he/she accepts the recognition for ring up. If the recognition is accepted, then the item is rung-up in step 1508. If not, then the operator must manually input the barcode or scan the item in step 1510. Thereafter, the transaction with ring up and automatic database update may proceed normally 1512.

In an alternate embodiment of the invention, the weight of an item is measured with the weight scale of the checkout system, and the measured weight is used both to increase the confidence of a visual recognition, and to enhance the ability to detect fraud. For example, while a model is in Accumulation mode, a statistical representation of the weight of the item can be updated as part of the item's record. During the utilization of the model for recognition and ring-up, the confidence score of the match can be a combination of the visual model's correlation score and a measure of how well the currently measured weight of the item being transacted matches the statistical weight model. If the measured weight is substantially different from the model's weight, a fraud alert is generated. This method detects fraud scenarios where a smaller but more valuable item is placed inside the packaging of a larger but less valuable item.

In another alternate embodiment of the invention, the dimensions of the item are measured with the depth sensor, and the measured dimensions are used to increase the confidence of a visual recognition and to enhance the ability to detect fraud. For example, while a model is in Accumulation mode, a statistical representation of the dimensions of the item can be stored as part of the item's record. During the utilization of the model for recognition and ring-up, the confidence score of the match can be a combination of the visual model's correlation score and a measure of how well the currently measured dimensions of the item being transacted matches the statistical dimension model. If the measured dimensions are substantially different from the model's dimensions, a fraud alert is generated.

In another alternate embodiment of the invention, a predetermined threshold is used to determine whether or not an item recognition based on a model in Live mode has a high enough confidence to allow the automatic ring-up of the item, or whether an exception should be generated to cause a store attendant to manually verify or perform the ring-up. The predetermined threshold would generally be higher (stricter) than a threshold for similar purpose used when the model is in accumulation mode.

In another embodiment of the invention, a predetermined threshold is used to determine whether or not a detection of fraud should generate an alert. The confidence of the visual recognition is compared to the threshold, and if the confidence is lower, the alert is not generated.

In another embodiment of the invention, the price difference between the item detected with a UPC scan and the item recognized based on an acquired image is used to determine whether a fraud alert should be generated when the UPC scan item and image recognized item differ. If the price of the recognized item exceeds that of the scanned item's price by a predetermined threshold, a UPC substitution fraud alert is generated. Otherwise the alert is not generated and the item detected by the UPC scan is rung-up.

In another embodiment of the invention where multiple images of an item are acquired during a transaction, the recognition results of each image are combined to determine if fraud is occurring and to determine whether or not to ring-up the item automatically without requiring human confirmation or correction. For example, an exception can be generated to require human intervention if not all recognitions correspond to the same item.

In another embodiment of the invention, when an alert is generated requiring human intervention, the operator is given the option to delete from the database a model which is causing erroneous recognitions, ring-ups, or fraud alerts, forcing the system to create a new model for the item during subsequent transactions.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. recites a merchandise check out system comprising:
one or more barcode scanners for reading a UPC codes on items; one or more imagers for acquiring images of items;
a data store configured to retain models of a plurality different of items, each model configured to associate a UPC of an item with one or more images of the item;
a processor configured to create a new model for an item by: reading a UPC on the item, acquiring images of the item, determining whether there is no matching model of an item out of any of the plurality of different items retained in the data store, and upon determining that there is no matching model, then associating the acquired images of the item with the UPC of the item as a new model and retaining the new mode in the data store.

2. recites a merchandise checkout system comprising:
a data store configured to store item records of a plurality of different items, each item record including an optical code and an associated visual model;
one or more optical code readers for reading an optical code on an object as the object is presented to or otherwise passed through the checkout system;
one or more imagers for acquiring images of the object as the object is presented to or otherwise passed through the checkout system;
a processor configured to create a new item record for an object by (1a) reading an optical code on the object, (1b) acquiring image(s) of the object, (1c) comparing the acquired image(s) of the object to the visual models of the plurality of different items in the data store (1d) determining whether there is no matching visual model in the data store, and (1e) upon determining that there is no matching visual model from any of the plurality of different items in the data store, creating a new item record with (i) the optical code that was read and (ii) a new visual model from the acquired images.

3. A merchandise checkout system according to claim 2, wherein the processor is further configured to (2) revise an existing visual model retained in the data store by combining the acquired images with the existing visual model in the data store if the acquired images match the existing visual model in the data store.

4. A merchandise checkout system according to claim 2, wherein the visual model for an item comprises (a) at least one image of the item and (b) one or more geometric point features extracted from the at least one image of the item.

5. A merchandise checkout system according to claim 4, wherein the geometric point features are scale-invariant features.

6. A merchandise checkout system according to claim 5, wherein the scale-invariant features are scale-invariant feature transform (SIFT) features.

7. A merchandise checkout system according to claim 2, wherein the processor is further configured to (2) combine the acquired images of the object with an existing visual model by:
a) comparing the acquired images to the visual models of existing items in the data store;
b) recognizing the object from the existing items based on the comparison; and
c) automatically combining the acquired images with the visual model in the data store if the acquired images of the object match the visual model.

8. A merchandise checkout system according to claim 2, wherein the processor is further configured to:
(2) extract geometric point features from the images of the object;
(3) compare the extracted geometric point features with the geometric point features of one or more visual models in the data store;
(4) determine if the object matches any of the items in the data store based on the comparison.

9. A merchandise checkout system according to claim 2, wherein the processor is further configured to transmit an alert if the visual model of the object matches the visual model of one of the items in the data store, but the optical code read from the object does not match the optical code associated with visual model of that item in the data store.

10. A merchandise checkout system according to claim 9, wherein the alert requires a manual override to be cleared.

11. A merchandise checkout system according to claim 2, wherein a visual model of an item comprises a plurality of images of the item.

12. A merchandise checkout system according to claim 11 wherein each of the plurality of images of the item corresponds to a side of the item.

13. A merchandise checkout system according to claim 2, wherein a visual model is created from at least one image of the item, each image corresponding to a side of an item.

14. A merchandise checkout system according to claim 11, wherein each of the plurality of images is of the same side of the item.

15. A merchandise checkout system according to claim 12, wherein the image of a single side of the item is composed of a plurality of images stitched together.

16. A merchandise checkout system according to claim 15, wherein the stitched image is stitched based on alignment of a plurality of corresponding geometric point features.

17. A merchandise checkout system comprising:
a data store configured to store item records of a plurality of items, each item record including an optical code and an associated visual model;
one or more optical code readers for reading an optical code on an object as the object is presented to or otherwise passed through the checkout system;

one or more imagers for acquiring images of the object as the object is presented to or otherwise passed through the checkout system;

a processor configured to (1a) compare the acquired image(s) of the object to the visual models of items in the data store and (1b) if there is no matching visual model in the data store, creating a new item record with (i) the optical code that was read and (ii) a new visual model from the acquired images, wherein a visual model is configured to have a state selected from the group consisting of: accumulation mode, live mode, and retired mode.

18. A merchandise checkout system according to claim 17, wherein a visual model is configured to transition from an accumulation mode to a live mode if the visual model of the item record has not been updated after a predetermined number of recognitions of the item based on that visual model.

19. A merchandise checkout system comprising:

a data store configured to store item records of a plurality of items, each item record including an optical code and an associated visual model;

one or more optical code readers for reading an optical code on an object as the object is presented to or otherwise passed through the checkout system;

one or more imagers for acquiring images of the object as the object is presented to or otherwise passed through the checkout system;

a processor configured to (1a) compare the acquired image(s) of the object to the visual models of items in the data store and (1b) if there is no matching visual model in the data store, creating a new item record with (i) the optical code that was read and (ii) a new visual model from the acquired images, wherein a visual model is configured to transition from a live mode to a retired mode if the optical code associated with the visual model has been read a predetermined number of times without the acquired images of the object being matched to the visual model of any item record in the data store.

20. A merchandise checkout system comprising:

one or more imagers for acquiring an image of an object being passed through or presented to the checkout system;

a data store configured to retain records for a plurality of items, each record for an item comprising (a) an optical code identifying the item and (b) a visual model of the item, the visual model comprising at least one image of the item and one or more geometric point features extracted from the at least one image of the item;

a processor configured to add a new record by:

a) comparing the image of the object to the visual model of at least one of the items in the data store;

b) recognizing the object from the items in the data store based on the image of the object;

c) determining whether the image of the object does not match the visual model of any of the item records in the data store; and d) upon determining that the image of the object does not match the visual model of any of the item records in the data store, automatically adding a new record with the acquired image to the data store.

21. The system of claim 20 wherein adding the acquired image to the data store comprises extracting one or more geometric point features from the image and adding the one or more geometric point features to the data store.

22. The system of claim 21 wherein the one or more geometric point features are scale-invariant feature transform (SIFT) features.

23. A method for merchandise checkout of objects presented to or otherwise passed through/by a checkout system, comprising the steps of storing, in a data store, item records of a plurality of items, each item record having (a) an optical code and (b) an associated visual model of the item;

as an object bearing an optical code is presented or passed through/by the checkout system, (1) reading the optical code on the object via an optical code reader, and (2) acquiring one or more images of the item via one or more imagers, comparing the images of the object to the visual models in the data store;

determining whether there is no existing visual model in the data store matching the object; and upon determining that there is no existing visual model already in the data store matching the object, creating a new item record with (a) the optical code of the object and (b) a visual model of the object and adding the new item record to the data store.

24. A method according to claim 23 wherein the visual model is comprised of a plurality of images and/or geometric point features.

25. A method according to claim 23 further comprising associating one or more acquired images with the optical code in an existing item record if the acquired images match the images of an existing model for the optical code of the item.

26. recites a method for merchandise checkout of objects presented to or otherwise passed through/by a checkout system, comprising the steps of acquiring an image of an object as it is presented to or otherwise passed through/by a checkout system and creating a new visual model therefrom;

comparing the new visual model of the object to existing visual models of items in a data store;

determining whether the new visual model of the object does not match any of the existing visual models of the items in the data store; and upon determining that the new visual model of the object does not match any of the existing visual models of the items in the data store, then automatically adding a new record with the new visual model to the data store.

* * * * *

UNITED STATES PATENT AND TRADEMARK OFFICE
CERTIFICATE OF CORRECTION

Page 1 of 1

PATENT NO. : 8,494,909 B2
APPLICATION NO. : 12/658581
DATED : July 23, 2013
INVENTOR(S) : Luis F. Goncalves It is certified that error appears in the above-identified patent and that said Letters Patent is hereby corrected as shown below:

In the Specification

<u>Column 2</u>
Line 15, change "visual" to --visually--.
Line 67, change "equivalently" to --equivalent--.

<u>Column 4</u>
Line 37, change "story" to --store--.
Line 41, after "refers" insert --to--.

<u>Column 11</u>
Line 15, change "model" to --mode--.

In the Claims

<u>Column 13</u>
Lines 32-33, change "plurality different of items" to --plurality of different items--.

Signed and Sealed this
Twenty-third Day of December, 2014

Michelle K. Lee
*Deputy Director of the United States Patent and Trademark Office*